United States Patent
Klaus (10) Patent No.: US 7,347,965 B2
(45) Date of Patent: Mar. 25, 2008

(54) APPARATUS AND METHOD FOR INJECTION MOLDING

(75) Inventor: M. Barr Klaus, Cincinnati, OH (US)

(73) Assignee: Uniloy Milacron USA, Inc., Manchester, MI (US)

( * ) Notice: Subject to any disclaimer, the term of this patent is extended or adjusted under 35 U.S.C. 154(b) by 234 days.

(21) Appl. No.: 11/239,192

(22) Filed: Sep. 29, 2005

(65) Prior Publication Data

US 2007/0069425 A1   Mar. 29, 2007

(51) Int. Cl.
  B29C 45/54 (2006.01)
  B29C 45/76 (2006.01)
(52) U.S. Cl. .............. 264/328.19; 425/145; 425/149; 425/559
(58) Field of Classification Search .......... 425/145, 425/149, 559; 264/328.19
See application file for complete search history.

(56) References Cited

U.S. PATENT DOCUMENTS

| | | | |
|---|---|---|---|
| 5,338,174 A | 8/1994 | Miese et al. | |
| 5,645,868 A | 7/1997 | Reinhart | |
| 5,747,076 A | 5/1998 | Jaroschchek et al. | |
| 5,916,602 A | 6/1999 | Klaus | |
| 6,200,127 B1 * | 3/2001 | Klaus | 425/557 |
| 6,478,572 B1 | 11/2002 | Shad | |
| 2004/0065974 A1 * | 4/2004 | Dantlgraber | 264/40.5 |
| 2004/0109917 A1 | 6/2004 | Shad | |

FOREIGN PATENT DOCUMENTS

| | | |
|---|---|---|
| JP | 2001001126 A | 1/2001 |
| WO | WO2005051603 A | 6/2005 |

OTHER PUBLICATIONS

European Patent Office Search Report and Written Opinion mailed Jan. 24, 2007.

* cited by examiner

Primary Examiner—Robert B. Davis
Assistant Examiner—Marissa W. Chaet
(74) Attorney, Agent, or Firm—John W. Gregg (57) ABSTRACT

An apparatus for injection molding comprises an injection unit comprising a plunger, the plunger being translated with accumulation of plasticized material in preparation for injection and being advanced to inject the accumulated plasticized material into mold cavities. At least one electric motor is engaged with the plunger to resist translation as melt is accumulated and to inject plasticized material into the mold cavities. At least one hydraulic actuator selectably operates the plunger during a pack and hold interval to supply supplemental force when force supplied by the electric motors is limited to maintain the operation of the motors within the applicable continuous duty rating thereof. The electric motors are advantageously selectably operatively engaged with the plunger to inject plasticized material into the mold cavities and the hydraulic actuators are operated to inject plasticized material into the mold cavities when the motors are not engaged therefore.

19 Claims, 4 Drawing Sheets

APPARATUS AND METHOD FOR INJECTION MOLDING

I. BACKGROUND OF THE INVENTION

Field of the Invention

This invention relates generally to injection molding and particularly to apparatus and methods for injection molding wherein high mold filling rates are achieved by high pressure injection.

Description of Related Art

Certain applications of injection molding require relatively high mold filling rates achieved with relatively high injection pressure, for example, for filling cavities defining relatively large thin walled sections that require single point injection. Insufficient rates of advance of melt through such cavities can result in partial solidification of melt before the cavity is completely filled. Depending on the volume of material subject to injection in a single shot, to effectively achieve the desired high mold filling rates, high rates of acceleration of melt may be required on the initiation of injection. Hence, the combination of desired high mold filling rate and the attendant required high rates of acceleration and high injection pressure require motive means for injection providing high levels of thrust with relatively low inertia. It is known to use hydraulically operated reciprocating screw injection molding machines for such applications. Nevertheless, because electrically driven mechanisms are effective to reduce noise, power consumption and potential contamination from hydraulic fluids, there is a demand for injection molding machines with electrically driven injection units.

A further requirement of certain applications of injection molding is to maintain melt pressure at relatively high values following injection while melt cures, the so-called "pack and hold" portion of a cycle of operation of an injection unit. While hydraulically operated injection units readily achieve the relatively high pressure of pack and hold required by such applications, the high torque required of electric servo motors and the attendant heat generated within the motors severely limits the duration that the required pressure can be maintained. Hence, conventional electric servo motors are not well suited to applications requiring pack and hold intervals of several seconds or more. In response to deficiencies of electric servo motors for operating injection mechanisms for certain injection molding applications, it has been proposed to provide hydraulic systems to supplement the force available from the electric drive. However, such proposed supplemental hydraulic drive systems have been adaptive, that is, providing supplemental force from the hydraulic actuators in response to sensing undesired performance by the electric motors acting alone. Hence, there remains a need for a an injection unit wherein a determination is made in advance of commencement of the pack and hold interval that motor force will be limited and supplemental force will be supplied by hydraulic actuators.

For applications within the capabilities of conventional electric servo motors, electrically operated reciprocating screw injection molding machines are known where synchronous servo motors provide precisely controlled acceleration, velocity, and torque. To extend the performance range achieved with electrically driven injection units, so called "two-stage" injection units are known comprising a plasticizing unit to convert raw material to so called "melt" and an accumulator to accumulate a so called "shot" of melt and inject it into the mold cavities. Electrically operated "two stage" injection units are capable of achieving higher injection speeds than electrically operated reciprocating screw injection units. The use of an accumulator permits design of an accumulator plunger having a length to diameter ratio chosen to reduce the thrust required for injection facilitating use of conventional electrically operated servo motors for plunger actuation. Nevertheless, satisfactory production of certain types of injection molded articles requires that mold filling takes place at rates and melt pressures for which conventional electric synchronous servo motors are inadequate notwithstanding reduced thrust requirements achieved with two stage injection systems. Hence there is a need to provide electrically driven injection units having selectable engagement of hydraulic actuators to accommodate molding applications for which the conventional electric servo motors are not suitable.

II. SUMMARY OF THE INVENTION

In accordance with the foregoing, it is an object of the present invention to provide apparatus and methods for injection molding wherein a plunger of an injection unit is operated by at least one electric motor and selectably by at least one hydraulic actuator during a pack and hold interval to supply supplemental force when force supplied by the electric motors is limited to maintain the operation of the motors within the applicable continuous duty rating thereof.

It is a further object of the present invention to provide apparatus and methods for injection molding wherein a plunger of an injection unit is operated by at least one electric motor and selectably by at least one hydraulic actuator during a pack and hold interval to supply supplemental force when force supplied by the electric motors is limited to maintain the operation of the motors within the applicable continuous duty rating thereof and the electric motors are selectably operatively engaged with the plunger, the motors being operatively engaged with the plunger to provide resistance to translation of the plunger during accumulation of plasticized material and selectably operatively engaged with the plunger to inject plasticized material into the mold cavities, the hydraulic actuators being operated to inject plasticized material into the mold cavities when the electric motors are not engaged therefore.

Further objects and advantages of the invention shall be made apparent from the accompanying drawings and the following description thereof.

In accordance with the aforesaid objects an apparatus for injection molding is disclosed wherein raw material is plasticized in an injection unit and injected therefrom into at least one mold cavity, the injection unit comprising a plunger, the plunger being translated with accumulation of plasticized material to be injected and being advanced to inject the accumulated plasticized material into the mold cavities, the apparatus comprising at least one electric motor for operating the plunger, at least one hydraulic actuator selectably operating the plunger during a pack and hold interval following injection of plasticized material into the mold cavities to maintain a desired melt pressure while the plasticized material solidifies, the hydraulic actuators being operated to supply supplemental force when force supplied by electric motors engaged to operate the plunger is limited to maintain the operation of the motors within the applicable continuous duty rating thereof, and a control, the control predetermining a force required to maintain melt pressure during the pack and hold interval and a supplemental force to be supplied by the hydraulic actuators so that the motors engaged to operate the plunger are operated within the applicable continuous duty rating thereof. Advantageously, the apparatus further comprises engaging means for selectably operatively engaging the plunger with each electric motor for operating the plunger, the motors being operatively engaged with the plunger to provide resistance to translation of the plunger during accumulation of plasticized material and selectably operatively engaged with the plunger to inject plasticized material into the mold cavities, the hydraulic actuators being operated to inject plasticized material into the mold cavities when the electric motors are not engaged therefore. An injection molding machine comprises apparatus in accordance with the invention. Methods for injection molding wherein raw material is plasticized and plasticized material is accumulated for injection into at least one mold cavity by a plunger, the plunger being translated with accumulation of plasticized material and being advanced to inject the accumulated plasticized material into the mold cavities comprise engaging at least one electric motor with the plunger, the motor being engaged with the plunger to provide resistance to translation of the plunger during accumulation of plasticized material and to provide force to inject plasticized material into the mold cavities, and selectably actuating the plunger with hydraulic actuators during a pack and hold interval following injection of melt into the mold cavities to maintain a desired melt pressure while the melt solidifies, the hydraulic actuators being operated to supply supplemental force when force supplied by electric motors engaged to operate the plunger is limited to maintain the operation of the motors within the applicable continuous duty rating thereof. The methods advantageously further comprise selectably operatively engaging the plunger with each electric motor for operating the plunger, the motors being operatively engaged with the plunger to provide resistance to translation of the plunger during accumulation of plasticized material and selectably operatively engaged with the plunger to inject plasticized material into the mold cavities, the hydraulic actuators being operated to inject plasticized material into the mold cavities when the motors are not engaged therefore.

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Injection Molding Machine

Figure 1:
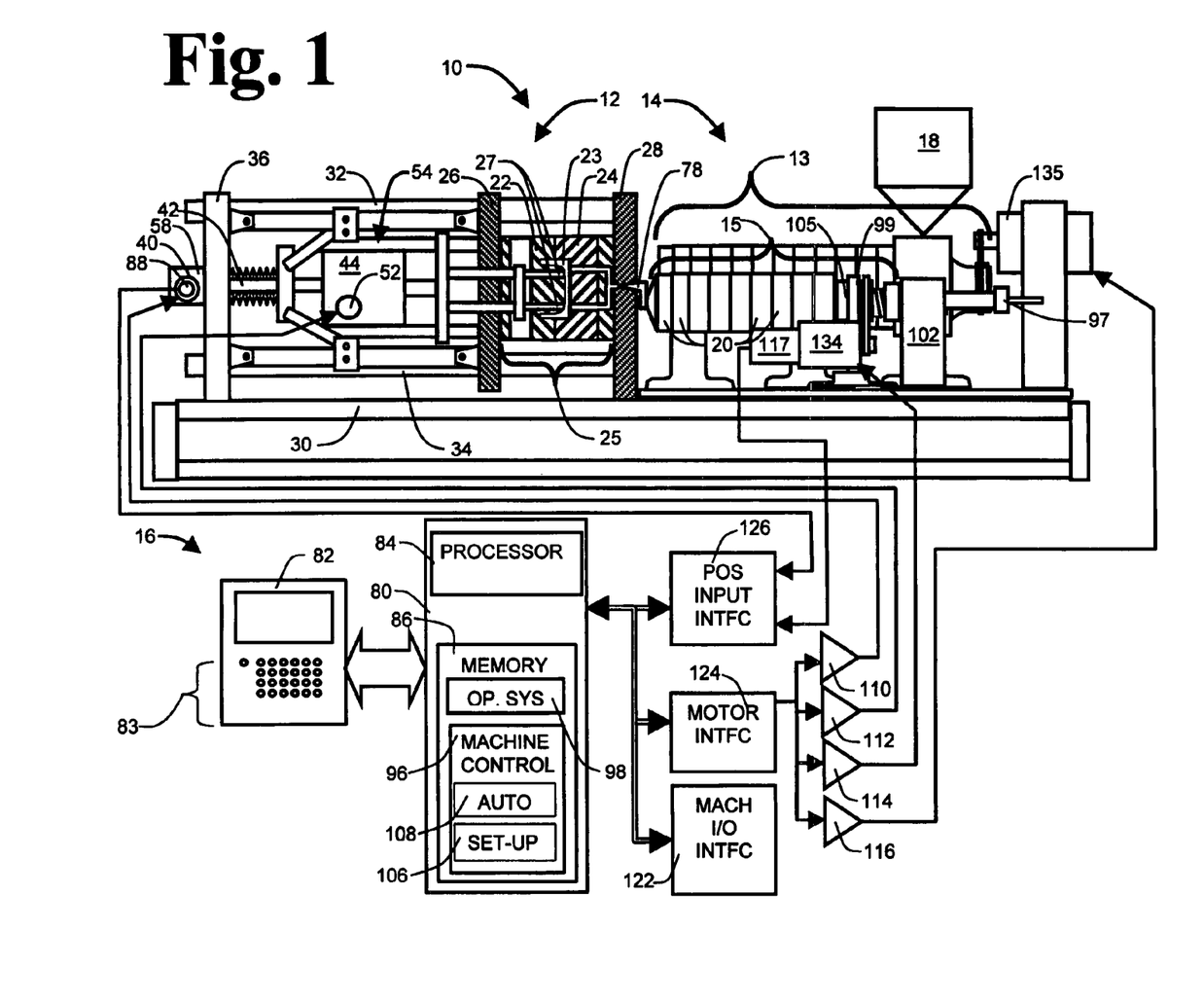
FIG. 1 illustrates an injection molding machine and control to which the invention is applied.
Figure 2:
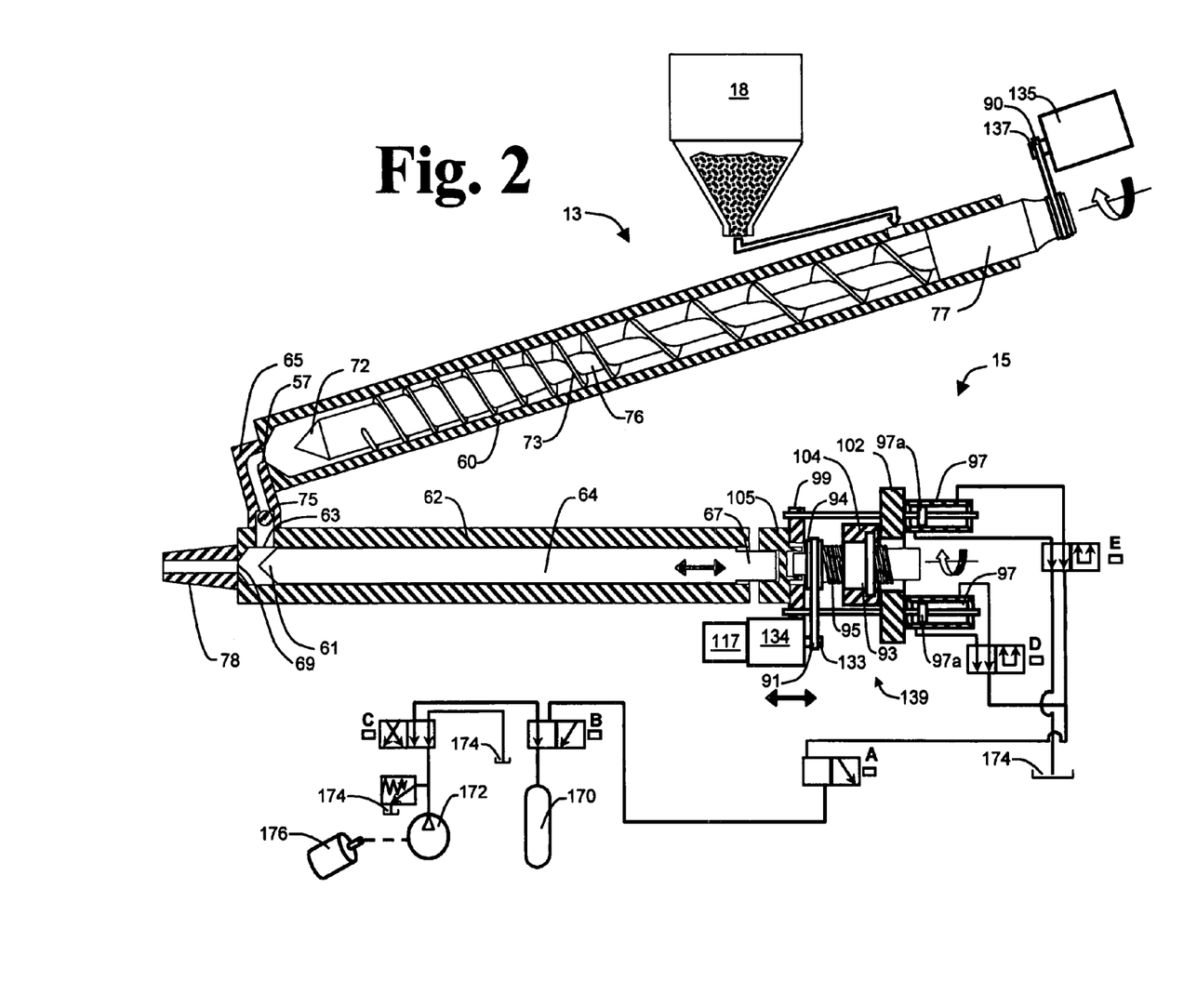
FIG. 2 illustrates a plasticizing unit in accordance with the invention.

Referring to FIG. 1, an injection molding machine 10 includes a clamp unit 12 and an injection unit 14. Raw material in the form of pellets and/or powders is introduced to injection unit 14 through feed hopper 18. Injection unit 14 comprises a plasticizing unit 13 comprising barrel 60 having an internal material working screw 76 (FIG. 2), referred to herein as the "plasticizing screw" and an accumulator 15 comprising an accumulator cylinder 62 having an internal plunger 64 (FIG. 2). Raw material entering barrel 60 is plasticized, i.e. converted from powder and/or particle form to a substantially homogeneous flowable mass, known as "melt", by heating and working the raw material. Material is worked by rotation of screw 76 by motor 135, rotation of shaft 137 driving rotation of screw 76 through drive belt 90 at shank end 77 (FIG. 2). Alternative transmissions may be interposed between motor 135 and screw 76, such as, for example gearing, for driving rotation of screw 76. While illustrated as applied to a machine with a two stage injection unit, the invention is suitable for operation of a reciprocating screw injection unit wherein injection is effected by translation of the material working screw. In such applications, the working screw functions to plasticize material, and functions as a plunger being retracted by accumulation of melt for injection and being advanced to inject melt into the mold cavities. Description of the operation of the plunger of the two stage injection unit of the appended drawings applies equally to the reciprocating operation of a working screw of a reciprocating working screw injection unit.

Continuing with reference to FIG. 1, mold cavity 23 is defined by mating mold sections 22 and 24 comprising mold assembly 25. Clamp unit 12 holds mold sections 22 and 24 together during injection and thereafter until the injected material has sufficiently solidified to be removed without unacceptable deformation. Mold sections 22 and 24 are then separated to permit release of molded articles. Clamp unit 12 comprises fixed platen 28, movable platen 26, thrust or "die height" platen 36 and toggle link mechanism 38. Fixed platen 28 supports mold section 24 and movable platen 26 supports mold section 22. Fixed platen 28 is rigidly mounted to machine base 30. Strain rod pairs 32 and 34 are supported at opposite ends by fixed platen 28 and thrust or die height platen 36. Movable platen 26 is slidably supported on strain rod pairs 32 and 34 for reciprocation between "open" and "closed" positions, "closed" referring to the advanced position as shown in FIG. 1. A toggle link mechanism 38, interposed between movable platen 26 and thrust platen 36, is operated by a rack and pinion combination comprising a rack 42 and pinion (not shown) within drive case 58. The pinion is rotated by motor 40 to translate rack 42 horizontally toward and away from fixed platen 28. Rack 42 is connected with toggle link crosshead 56. Alternatively, reciprocation of toggle link crosshead 56 may be effected by other known actuators including a motor driven low friction screw and nut combination or hydraulically operated actuators. Toggle link mechanism 38 is preferably operable to a "lock-over" configuration, as shown in FIG. 1 wherein serial pivoting links between thrust platen 36 and movable platen 26 are longitudinally aligned. On opening of mold assembly 25, reciprocation of crosshead 56 pivots these links to reduce the effective length spanned by the links and draw movable platen 26 away from fixed platen 28.

The combination of rack and pinion and toggle link mechanism 38 provides sufficient mechanical advantage to convert torque at motor 40 to the force required to drive toggle link mechanism to lock-over. As is conventional, motor 40 is preferably a servo-motor and includes or works in combination with a position measuring transducer 88 which produces electrical signals representing position of the motor armature. In the configuration illustrated in FIG. 1, position transducer 88 may be an encoder for measuring angular position of an armature of motor 40. Were motor 40 a linear motor, position transducer 88 could as well measure linear position of the motor armature. Alternatively, position transducer 88 may measure linear displacement and be mechanically coupled to crosshead 56.

Continuing with reference to FIG. 1, a power operated ejector mechanism 54 is illustrated in FIG. 1 disposed between thrust platen 36 and movable platen 26. Ejector mechanism 54 effects translation of movable members in mold section 22, such as ejector pins 27, to dislodge an article from mold section 22. Motor 52 provides motive force for ejector mechanism 54 through transmission 44.

Referring to FIG. 2, plasticizing unit barrel 60 and accumulator cylinder 62 are shown in partial sections revealing plasticizing screw 76 and plunger 64, respectively. Raw material enters barrel 60 from hopper 18 proximate shank end 77 of plasticizing screw 76. With rotation of screw 76, raw material is converted to melt and conveyed past tip 72. The flights (threads) 73 of screw 76 have a thread depth and pitch chosen for plasticizing the type of material being used. As is known, both thread depth and pitch vary over the length of screw 76 in accordance with the working being performed. Thread depth and pitch advantageously are characterized by "zones" according to changes of material being plasticized as it is advanced toward tip 72, for example, a feed zone, a mixing zone and a pumping zone. Melt exits plasticizing barrel 60 at outlet 57 and enters connecting passage 65 joining outlet 57 with melt inlet 63 of accumulator cylinder 62. A check ball valve 75 proximate melt inlet 63 allows melt to pass from barrel 60 to accumulator cylinder 62 and blocks melt from returning to barrel 60 during injection. Melt entering accumulator cylinder 62 at melt inlet 63 displaces plunger 64 away from nozzle 78. In automatic operation, passages from nozzle 78 to mold cavity 23 are sealed during accumulation of melt by closure of valves (not shown) or solidification of melt within nozzle 78 and/or passages therefrom to mold cavity 23, preventing melt from passing through nozzle 78. Once a desired volume of melt, a so called "shot", resides between plunger 64 and nozzle 78, plunger 64 is advanced toward nozzle 78 to force melt through nozzle 78 into mold cavities of mold assembly 25. Advance of plunger 64 is effected by application of thrust at drive end 67. As is known, advance of plunger 64 may be effected to vary velocity during injection, changes of velocity advantageously being effected at predetermined positions of the travel of plunger 64.

Continuing with reference to FIG. 2, during accumulation of melt in accumulator cylinder 62, force transmitted through melt admitted at melt inlet 63 is applied to tip 61 driving plunger 64 away from outlet 69. Drive end 67 of plunger 64 is received in coupling 105 mounted to movable injection platen 99. Translation of plunger 64 away from outlet 69 is coupled to movable injection platen 99 driving it away from nozzle 78. In addition, the forward end of drive screw 95 is received within coupling 105 so that with accumulation of melt in accumulator cylinder 62, drive screw 95 is driven with movable platen 99 away from nozzle 78. Drive screw 95 is advantageously a low friction drive screw such as a ball screw or roller screw and is supported within coupling 105 so as to be rotatable relative thereto. The threads of drive screw 95 engage drive nut 93 which is mounted within support housing 104 so as not to be rotatable relative thereto. Support housing 104 is attached to fixed injection platen 102, whereby, as a consequence of the engagement of drive screw 95 with drive nut 93, translation of drive screw 95 relative to drive nut 93 is converted to rotation of drive screw 95. Hence, with accumulation of melt in accumulator cylinder 62, drive screw 95 is caused to rotate by the force driving plunger 64 away from outlet 69. To insure the increasing volume of accumulator cylinder 62 is kept filled during accumulation f melt, resistance to the force transmitted by accumulating melt is applied as torque to drive screw 95. Insufficient resistance could result in incomplete filling of the volume with displacement of plunger 64 and excessive resistance could increase the time required to accumulate a predetermined quantify of melt. Resisting torque is supplied by servo motor 134 through transmission 139. As servo motor 134 is supported with movable injection platen 99, servo motor 134 translates with drive screw 95. Accumulation of a predetermined volume of melt is determined from the relative position of plunger 64 within accumulator cylinder 62, such position advantageously being represented by position signals produced by position transducer 117.

Continuing with reference to FIG. 2, electrically driven injection is effected by rotation of drive screw 95 by servo motor 134 through transmission 139. Transmission 139 is shown as comprising drive belt 91 connecting drive screw 95 with motor shaft 33. Transmission 139 may alternatively be gearing or any suitable transmission to couple rotation of motor shaft 33 to drive screw 95, the particular arrangement being chosen according to the speed and force required. By virtue of engagement of threads of drive screw 95 with drive nut 93, rotation of drive screw 95 causes translation thereof relative to drive nut 93 and fixed injection platen 102. As drive screw 95 is translated, coupling 105 translates plunger 64 toward outlet 69. Injection is complete when plunger 64 has reached a predetermined position relative to accumulator cylinder 62 whereat accumulated melt will have been purged therefrom. Hydraulically operated actuators, such as piston/cylinder actuators 97 are selectably employed for applications requiring injection or pack and hold performance for which conventional electric servo motors are not well suited. Piston/cylinder actuators 97 apply thrust to movable injection platen 99 by reaction with fixed injection platen 102. Hydraulic actuators 97 are illustrated as so-called "double-rod" actuators whereby the effective surface area for actuation is equal in forward and reverse directions. The internal volume of actuators 97 is divided by the location of pistons 97a. Hydraulic fluid from accumulator 170 is admitted to the ends of hydraulic actuators 97 to apply force to movable injection platen 99 to inject melt into the mold cavities. With advance of pistons 97a, hydraulic fluid is drained from the opposite ends of hydraulic actuators 97 and conducted to reservoir 174. Advantageously, the hydraulic system comprising actuators 97, accumulator 170, pump 172 and pump motor 176 are configured and operated to achieve high energy efficiency. In particular, capacity of pump 172 and power rating of pump motor 176 are chosen to deliver a maximum power value well below the instantaneous power required for high pressure injection. Additionally, pump 172 is advantageously operated intermittently to charge accumulator 170 during periods of the cycle of operation of machine 10 when hydraulic force is not required. Further efficiency is achieved by valved connections of hydraulic actuators 97 to circulate hydraulic fluid around actuators 97 during electrically powered injection and accumulation of melt. The re-circulation of hydraulic fluid around actuators 97 reduces the required volume of reservoir 174 by the volume of hydraulic fluid retained in actuators 97 and permits restriction of operation of pump motor 176 to intervals when servo motor 134 is not operating.

In accordance with the invention, electrically driven operation of plunger 64 is selectably employed. For applications where force required for operation of plunger 64 according to process parameters is within the capacity of conventional synchronous AC servo motors, servo motor 134 powers operation of plunger 64 by rotation of drive screw 95. Advantageously, servo motor 134 may be selectably engaged to transfer torque to drive screw 95 to operate plunger 64 for either or both injection and pack and hold, and for providing resistance during accumulation of melt. Servo motor 134 is selectably engaged by, for example, clutch 94 that rotatably engages drive belt 91 with drive screw 95. Suitable clutches may be pneumatically or electrically operated to permit engagement or disengagement prior to rotation of any clutch elements.

Machine Control

Referring to FIG. 1, machine control 16 comprises primary processor 80, operator station 82 and electrical interface devices interposed between machine devices and primary processor 80. It is contemplated that primary processor 80 comprise at least one program controlled processor 84 and more particularly comprises so many program controlled processors as appropriate to achieve the desired level of data processing capability to provide functions and features desired for program controlled operation of machine 10. In addition to processors primarily engaged in performing logical operations and data exchanges with memory, one or more processors tailored to performing mathematical operations, such as so-called "math co-processors", may comprise primary processor 80. Operator station 82 permits data exchanges with primary processor 80 by a user. Operator station 82 comprises push buttons and indicators 83 which are connected to interface circuits comprising primary processor 80.

Continuing with reference to FIG. 1, interface devices provide facilities for producing control signals for machine devices in response to outputs produced by primary processor 80. In addition, interface devices provide facilities for producing inputs for primary processor 80 in response to sensed conditions of machine devices. Outputs of primary processor 80 defining, for example, position, velocity, and/or acceleration are conditioned as appropriate at motor interface circuits 124 and applied to motor drives 110, 112, 114 and 116 to control electrical current delivered to motors 40, 52, 134, and 135 from a suitable power source. As is conventional, signals produced by position transducers 111 and 117 are used for control of motors 40 and 134. Outputs of transducers 111 and 117 are conditioned by position interface circuits 126 to produce inputs to primary processor 80. Machine input/output interface circuits 122 perform signal conditioning for other signals produced by or applied to machine devices. As shown in FIG. 1, electrical connections are provided between interface circuits 122, 126 and 124, and primary processor 80 to permit exchange of signals between primary processor 80 and the interface circuits.

Programs executed by primary processor 80 are stored in local memory and include operating system programs 98 and application programs such as machine control programs 96. Operating system programs effect management of resources of primary processor 80 and of execution of application programs. Machine control programs 96 are executed by processors of primary processor 80 to effect control over machine devices. Machine control programs 96 permit at least two modes of operation of machine 10: (i) an automatic mode for normal production; and (ii) a set-up or manual mode, for preparing the machine and machine devices for production and for setting parameter values used by machine control programs 96 in production of particular articles from particular material. The automatic mode of operation is associated with "AUTO" programs 108, and the set-up or manual mode of operation is associated with the "SET-UP" programs 106. Irrespective of whether the mode of operation is automatic or manual, execution of machine control programs 96 by processor 80 perform logical and arithmetic functions to monitor and control the operation of machine devices, such as motors 40, 52, 134, and 135 which actuate mechanisms of the injection molding machine, heaters 20 and other devices not shown but typical of such machines and associated equipment. In addition, execution of machine control programs 96 can result in commands for establishing modes of operation of cooperating auxiliary devices and equipment to accommodate temporary interruptions of automatic operation of machine 10.

Figure 3A:
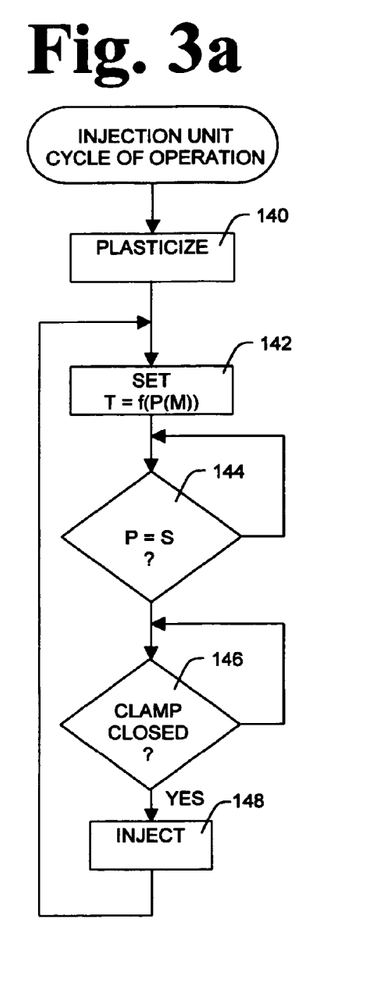
FIGS. 3*a*-3*d* illustrate procedures for control of an injection unit in accordance with the invention.
Figure 3B:
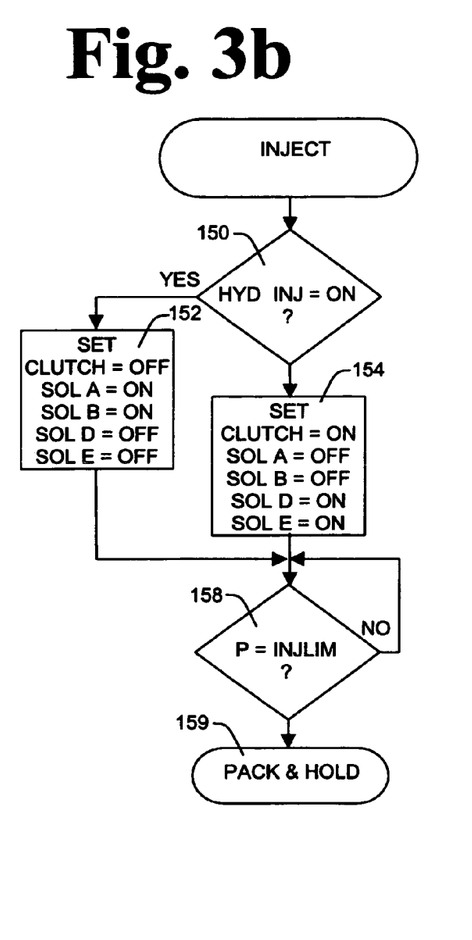

FIGS. 3a and 3b are flow charts representing operation of machine 10 effected by execution of machine control programs 96. The functions represented by FIGS. 3a and 3b are advantageously effected in automatic operation associated with execution of automatic mode programs 108, but may be performed in a discontinuous manner in connection with manual operation associated with set-up programs 108.

Referring to FIG. 3a, a flow chart of a cycle of operation of injection unit 14 is depicted. At step 140 melt is produced with rotation of plasticizing screw 76 from raw material admitted to barrel 60 from hopper 18. Melt is conveyed by rotation of screw 76 through connecting passage 65 and melt inlet 63 into accumulator cylinder 62 between plunger 64 and nozzle 78. Sufficient raw material is plasticized to accumulate a predetermined quantity of melt, a so-called "shot". As melt is accumulated, servo motor 134 is operated to provide resistance to advance of melt as reflected by step 142 where motor torque "T" is set as a function "f" of desired melt pressure "P(M)". Accumulation of the predetermined quantity of melt is reflected by plunger 64 arriving at a position "P" corresponding to the shot volume ("S") as indicated by step 144. Decision step 146 determines that clamp unit 12 is closed and process step 148 represents injection of melt from injection unit 14 to mold cavity 23. Injection is complete with expiration of the so-called pack and hold interval, a predetermined period of time during which melt pressure is maintained at a predetermined level to continue to force melt into mold cavity 23 as solidifying melt shrinks. Thereafter, the cycle of operation of the injection unit is repeated.

Referring to FIG. 3b injection step 148 of FIG. 3a is expanded to illustrate operation of the drive mechanisms of plunger 64 in accordance with the invention. At decision step 150 it is determined whether plunger advance is to be effected by motor 134 or hydraulic actuators 97 in accordance with user selection of hydraulics "ON" or "OFF". If hydraulic injection is selected "OFF", advance of plunger 64 is effected by operation of servo motor 134 to translate plunger 64 to inject melt into the mold cavities. Clutch 94 is activated to engage rotation of motor 134 with drive screw 95 and hydraulic fluid re-circulation paths around actuators 97 are completed by operation of solenoid operated valves D and E. Hence, at step 154, clutch 94 is set "ON" and solenoid operated valves D and E are set "ON". In addition, solenoid operated valves A and B are set "OFF" to disconnect hydraulic actuators 97 from accumulator 170.

If hydraulic injection is selected "ON", plunger 64 is advanced by operation of hydraulic actuators 97. Hence, at step 152 solenoid operated valves A and B are set "ON" and solenoid operated valves D and E are set "OFF" connecting hydraulic actuators 97 with accumulator 170 and reservoir 174. In addition, clutch 94 is set "OFF" disengaging motor 134 from drive screw 95. Servo motor 134 is disengaged during hydraulically actuated injection to prevent generation of electrical energy by motor rotation that would occur with translation of drive screw 95. Generation of electrical energy by servo motor 134 would require controlled dissipation to prevent damage to electrical current carrying components connected to servo motor 134. As hydraulic fluid is admitted to actuators 97 on one side of pistons 97a to inject melt, hydraulic fluid within actuators 97 on the other side of pistons 97a is drained to reservoir 174.

Irrespective of whether injection is effected by motor 134 or actuators 97, injection is complete with arrival of plunger 64 at position "P" having limit value INJLIM. Decision step 158 reflects detection of arrival of plunger 64 at this position. Step 159 represents control of plunger 64 in accordance with a pack and hold procedure. During the pack and hold interval, thrust is maintained to maintain melt pressure while melt solidifies in the mold cavities. At the expiration of the pack and hold interval, injection step 148 of FIG. 3a is complete.

Advantageously, servo motor 134 and hydraulic actuators 97 operate together during pack and hold. Servo motor 134 is controlled to prevent excessive motor heating by setting a limit value for torque during the pack and hold interval. Values defining melt pressure to be maintained during pack and hold, and pack and hold duration comprise user established parameters controlling the cycle of operation of machine 10. Torque from servo motor 134 required to maintain the specified melt pressure is computed according to:

$$TP = PM * K1 \quad \text{equation (1)}$$

Where:

TP is the motor torque required during the pack and hold interval

PM is the specified melt pressure

K1 is a constant of proportionality

\* denotes multiplication

Melt pressure is proportional to force exerted by plunger 64 and the cross sectional area of melt to which the force is applied by plunger 64. Force exerted by plunger 64 is proportional to torque at motor shaft 133, in accordance with the torque transfer ratio of transmission 139 and the lead angle of threads of drive screw 95.

In the event required torque is greater than continuous duty torque for servo motor 134, a torque limit is determined according to motor heating attributable to the excess torque requirement, the duration of the pack and hold interval during which melt pressure is to be maintained and the recovery time in automatic operation following pack and hold when motor operation will not require excess torque. In the event insufficient recovery time is available to dissipate excess motor heating, motor toque is limited to a value less than required torque as necessary to permit return to continuous duty operating temperature within the available recovery time. A supplemental force required to achieve the specified melt pressure is supplied by hydraulic actuators 97. The required supplemental force is produced by controlling the hydraulic pressure applied to hydraulic actuators 97. The hydraulic pressure required to produce the supplemental force is determined in accordance with:

$$P(H) = (TP - \text{LIMT}) * K2 \quad \text{equation (2)}$$

Where

P(H) is hydraulic pressure to produce the supplemental force

TP is the required motor torque to produce melt pressure PM

LIMT is the limit of motor torque during the pack and hold interval

K2 is a constant of proportionality

The supplemental force is equal to the difference between the required force and the force produced by motor 134 when operated subject to the torque limit LIMT. Force acting on plunger 64 is proportional to torque at motor shaft 133 in accordance with the torque transfer ratio of transmission 139 and the lead angle of the thread of drive screw 95. Hydraulic pressure is proportional to force applied to plunger 64 in accordance with the cross-sectional area of the pistons 97a to which the hydraulic pressure is applied. Computation of a torque limit value and hydraulic pressure value is advantageously effected during a machine set-up procedure when operating parameters are adjusted to achieve desired performance. The computed torque limit value and hydraulic pressure values are saved in control memory 86 for use during automatic operation of machine 10.

Figure 3C:
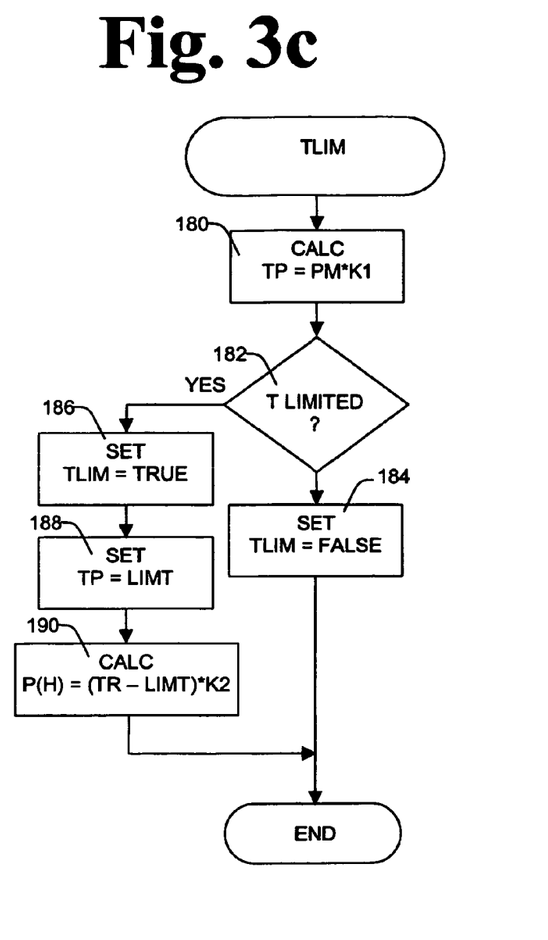

A procedure for implementing determination of a limit value for motor torque and a hydraulic pressure for application during the pack and hold interval is illustrated by the flow chart of FIG. 3c. Step 180 represents calculation of the torque required to maintain melt pressure specified for the pack and hold interval. Calculation of step 180 proceeds in accordance with equation (1). Decision step 182 represents the determination of whether the required torque calculated at step 180 exceeds the torque that can be supplied while maintaining operation of motor 134 within its continuous duty rating. This determination is advantageously made using root mean square ("RMS") torque calculated with the required torque TP and the pack and hold interval duration tD as follows:

$$T(\text{RMS}) = ((\Sigma(TP**2)*tD, (TI**2)*tI, (TA**2)*tA, (TO**2)*tO)/\Sigma(tD, tI, tA, tO))**0.5$$

Where

T(RMS) is the RMS torque

TP is torque during the pack and hold interval

TI is torque during injection

TA is torque during "shot" accumulation

TO is idle torque tD is the duration of pack and hold tI is the duration of injection tA is the duration of "shot" accumulation tO is the duration of idle \*\* indicates exponentiation \* indicates multiplication RMS torque is compared with the continuous duty torque of the motor to detect an excess of RMS torque. In the event the RMS torque exceeds the continuous duty torque, torque limit during the pack and hold interval is required. Any suitable method for insuring that the continuous duty torque of motor 134 is not exceeded may be employed in connection with the determination represented by decision step 182, Continuing with reference to FIG. 3c, if it is determined at decision step 182 that motor torque will not be limited, a torque limit indicator TLIM is set false at step 184 and the procedure is complete. Had it been determined at decision step 182 that torque of motor 134 is to be limited during the pack and hold interval, the torque limit indicator TLIM is set true at step 186. At step 188 the torque limit value is selected to restrain torque during the pack and hold interval to maintain motor operation within the continuous duty torque rating. A limit value for torque during the pack and hold interval can be determined from a solution for TP of the equation for RMS torque T(RMS) and using the continuous duty torque value of motor 134 for T(RMS), and specified values of TA, TI, TO and tA, tD, tI and tO. Alternatively, any procedure may be used to select a limit value that accounts for motor heating and recovery time during automatic operation. At step 190 a value of hydraulic pressure required to produce supplemental force to maintain melt pressure at the specified value during pack and hold is calculated in accordance with equation (2).

Figure 3D:
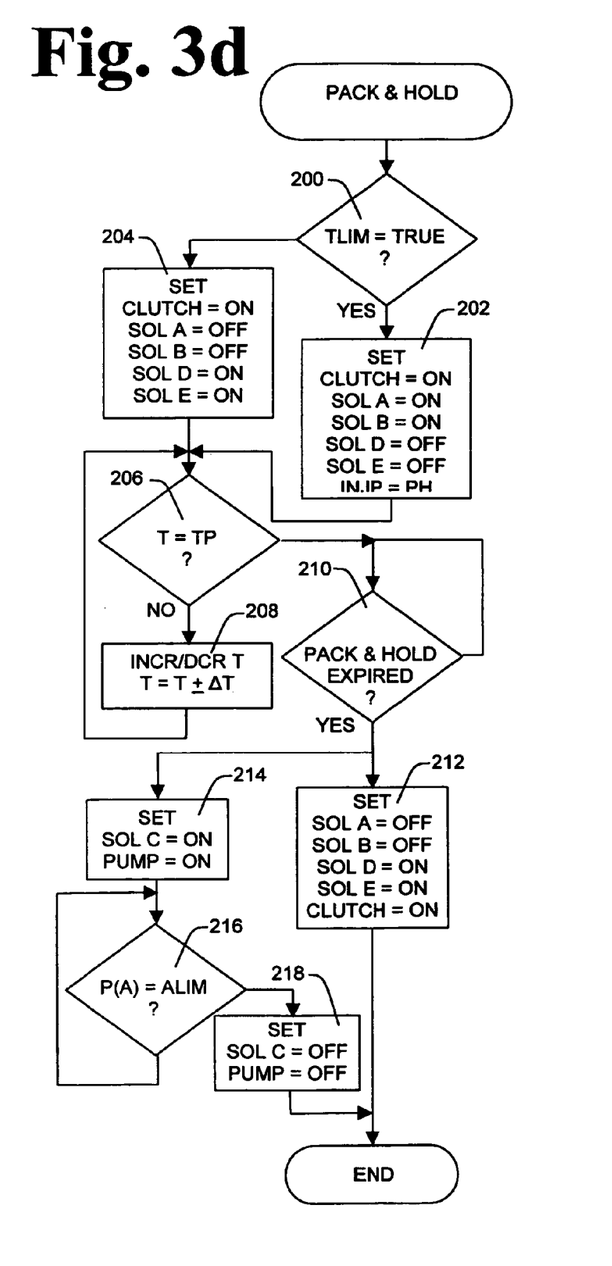

A procedure for implementing proportioning of force from hydraulic actuators 97 and servo motor 134 is illustrated by the flow chart of FIG. 3d. At decision step 200 it is determined whether or not motor torque during pack and hold is to be limited as indicated by the condition of the torque limit indicator TLIM established, for example, at one of steps 184 and 186 of FIG. 3c. If torque of motor 134 will not be limited, hydraulic actuators 97 will not be operated during pack and hold. Accordingly, at step 204, clutch 94 is activated, solenoid operated valves A and B are set "OFF" and solenoid operated valves D and E are set "ON". With solenoid operated valves A and B set "OFF", accumulator 170 is disconnected from actuators 97; with solenoid operated valves D and E set "ON", the hydraulic fluid circulation paths around actuators 97 are completed. Had it been determined at decision step 200 that motor torque is limited during the pack and hold interval, hydraulic actuators are operated to provide the supplemental force required to maintain the desired melt pressure. At step 202, clutch 94 is activated, solenoid operated valves A and B are set "ON", solenoid operated valves D and E are set "OFF" and hydraulic pressure applied to actuators 97 is set to the value P(H) determined in accordance with equation 2. With solenoid operated valves A and B set "ON", accumulator 170 is connected with actuators 97; with solenoid operated valves D and E set "OFF" the hydraulic fluid circulation paths around actuators 97 are interrupted and paths to drain hydraulic fluid to reservoir 174 are completed.

Continuing with reference to FIG. 3d, to avoid step changes of motor torque between injection and pack and hold, changes of torque are implemented incrementally at a predetermined rate. Decision step 206 represents determination of whether the value of motor torque "T" in effect for injection is equal to torque TP required for the pack and hold interval. If not, the effective torque is increased or decreased at step 208 by a predetermined increment ΔT. Decision step 206 and step 208 are repeated at a predetermined rate until the effective torque T is made equal to the value TP required for the pack and hold interval. Decision step 210 represents determination of expiration of the predetermined pack and hold interval. At the expiration of the pack and hold interval, hydraulic actuators 97 are disconnected from accumulator 170, and pump 172 is operated to recharge accumulator 170. Hence, at step 212 solenoid operated valves A and B are set "OFF", solenoid operated valves D and E are set "ON" and clutch 94 is set "ON" in preparation for accumulation of the next "shot" of melt. At step 214 solenoid operated valve C is set "ON" and pump 172 is set "ON" to allow a charge of hydraulic fluid to be pumped from reservoir 174 to accumulator 170. Pumping will continue until hydraulic pressure "P(A)" within accumulator 170 has reached a predetermined value "ALIM". Decision step 216 represents detection of the predetermined pressure ALIM marking the desired charge of hydraulic fluid in accumulator 170. Once detected, pumping is ceased and the accumulator is disconnected from pump 172. At step 218, pump 172 is set "OFF" and solenoid operated valve C is set "OFF" disconnecting accumulator 170 from pump 172. Charging of accumulator 170 may proceed during accumulation of the next "shot" of melt. Hence, expiration of the pack and hold interval marks the end of the injection step 148 of the cycle of operation of FIG. 3a.

The methodology for determining in advance of commencement of the pack and hold interval that motor torque is to be limited during the pack and hold interval and for apportioning force supplied by motor 134 and hydraulic actuators 97 is applicable to constructions in which motor 134 is not selectably engaged with plunger 64. An injection molding machine 10 wherein injection of melt is achieved with electrically operated motors is advantageously improved by providing hydraulic actuators for supply of supplemental force during the pack and hold interval only and operating the electrically operated motors and hydraulic actuators accordingly. Such constructions permit using motors having reduced continuous duty ratings for operating the plunger. In such arrangements, no mechanism would be present for selectably engaging the motors for injection, and the procedure of FIGS. 3b and 3d would not include the activation or deactivation of clutch 94.

While the preferred embodiment has been illustrated wherein injection unit 14 comprises a plasticizing unit and accumulator, the invention is equally applicable to a so called "single-stage" injection unit wherein the plasticizing screw serves both to plasticize material and inject melt into mold cavities. In such arrangements, the plasticizing screw functions as the plunger for accumulation of a "shot" of melt, for injection of melt into the mold cavities and for maintaining melt pressure during the pack and hold interval. The apparatus and method of the invention would apply to electrical motors and hydraulic actuators applied to effect translation of the plasticizing screw functioning as a plunger in such arrangements. As used herein, the term "plunger" is intended to identify the element of an injection unit that is translated to effect accumulation of melt for injection and injection of melt into mold cavities.

The preferred embodiment has been illustrated with transmission 139 coupling motor 134 to drive screw 95. Drive screw 95 and drive nut 93 can be alternatively arranged to provide rotation of drive nut 93 rather than drive screw 95. In such an arrangement, motor 134 would be coupled by transmission 139 to drive nut 93 and drive nut 93 would be rotatably supported in fixed platen 102. For injection, rotation of drive nut 93 would be converted to advance of plunger 64 toward outlet 69 through interaction of drive nut 93 with screw threads of drive screw 95. For melt accumulation, displacement of plunger 64 away from outlet 69 would be converted to rotation of drive nut 93 through interaction with screw threads of drive screw 95. Motor 134 would be selectably engaged by clutch 94 with drive nut 93 rather than drive screw 95.

While the preferred embodiment has been illustrated wherein servo motor 134 is a rotating machine, plunger 64 could as well be operated by one or more linear motors. Operative engagement of each linear motor with plunger 64 being accomplished by an engaging device for coupling thrust developed between the motor armature and motor stator to plunger 64. As the armature and stator of linear motors effect translation directly without conversion of rotation, drive screw 95 and drive nut 93 are omitted from such arrangements. The armature of each linear motor would advantageously be selectably engaged with movable platen 99 by pneumatically or electrically operated devices such as clamps or mechanical interlocks that would be operated to effect engagement in place of clutch 94. Hence, to prevent generation of energy by linear motors during injection effected with hydraulic actuators, the motor armature would be disengaged from movable platen 99 and, during accumulation of melt, the motor armature would be engaged with movable support platen 99 to provide resistance to force transmitted by the accumulating melt. As used herein, engaging means for selectably engaging an electric motor and plunger applies equally to clutch 94 in the arrangement illustrated in FIG. 2 where motor 134 is a rotating machine and devices having equivalent functionality suitable for use with linear motors.

What is claimed is:

1. An apparatus for injection molding wherein raw material is plasticized in an injection unit and injected therefrom into at least one mold cavity, the injection unit comprising a plunger, the plunger being translated with accumulation of plasticized material to be injected and being advanced to inject the accumulated plasticized material into the mold cavities, the apparatus comprising:
   a) at least one electric motor engageable with the plunger to resist translation during accumulation of plasticized material and to advance the plunger to inject the plasticized material into the mold cavities;
   b) at least one hydraulic actuator selectably operating the plunger during a pack and hold interval following injection of plasticized material into the mold cavities to maintain a desired melt pressure while the plasticized material solidifies, the hydraulic actuators being operated to supply supplemental force when force supplied by electric motors engaged to operate the plunger is limited to maintain the operation of the motors within the applicable continuous duty rating thereof; and
   c) a control, the control predetermining a force required to maintain melt pressure during the pack and hold interval and a supplemental force to be supplied by the hydraulic actuators so that the motors engaged to operate the plunger will be operated within the applicable continuous duty rating thereof.

2. The apparatus according to claim 1 wherein the motors engaged to operate the plunger are operated to prevent step changes of force between injection and the pack and hold interval, the control changing the effective force by predetermined increments at a predetermined rate to conform the effective force to the force required of the motor for the pack and hold interval.

3. The apparatus according to claim 1 further comprising engaging means for selectably operatively engaging the plunger with each electric motor for operating the plunger, the motors being operatively engaged with the plunger to provide resistance to translation of the plunger during accumulation of plasticized material and selectably operatively engaged with the plunger to advance the plunger to inject plasticized material into the mold cavities, the hydraulic actuators being operated to inject plasticized material into the mold cavities when the electric motors are not engaged therefore.

4. The apparatus according to claim 3 wherein the electric motors operating the plunger are rotating machines and the apparatus further comprises a drive screw and drive nut for converting rotation effected by each such motor to translation coupled to the plunger and the engaging means for each such motor is a clutch for selectably engaging rotation of the motor with one of the drive nut and drive screw whereby rotation of the motor effects translation of the plunger.

5. The apparatus according to claim 1 wherein the hydraulic actuators are operated with pressurized hydraulic fluid supplied from a hydraulic accumulator, the hydraulic accumulator being charged with pressurized hydraulic fluid for operation of the hydraulic actuators.

6. The apparatus according to claim 1 wherein the injection unit further comprises a plasticizing unit comprising a barrel and working screw therein and an accumulator comprising an accumulator cylinder and a plunger therein, plasticized material from the plasticizing unit being accumulated in the accumulator for injection into the mold cavities.

7. The apparatus according to claim 6 further comprising engaging means for selectably operatively engaging the plunger with each electric motor for operating the plunger, the motors being operatively engaged with the plunger to provide resistance to translation of the plunger during accumulation of plasticized material and selectably operatively engaged with the plunger to inject plasticized material into the mold cavities, the hydraulic actuators being operated to inject plasticized material into the mold cavities when the electric motors are not engaged therefore.

8. An injection molding machine comprising:
   a) a clamp unit comprising a mold assembly having at least one mold cavity for receiving plasticized material, the clamp unit opening and closing the mold assembly to permit molding of plasticized material therein and removal of molded articles therefrom;
   b) an injection unit wherein raw material is plasticized and injected therefrom into the mold cavities, the injection unit having a plunger being translated with accumulation of plasticized material and being advanced to inject the accumulated plasticized material into the mold cavities;
   c) at least one electric motor engageable with the plunger to resist translation during accumulation of plasticized material and to advance the plunger to inject the plasticized material into the mold cavities;
   d) at least one hydraulic actuator selectably operating the plunger during a pack and hold interval following injection of plasticized material into the mold cavities to maintain a desired melt pressure while the plasticized material solidifies, the hydraulic actuators being operated to supply supplemental force when force supplied by electric motors engaged to operate the plunger is limited to maintain the operation of the motors within the applicable continuous duty rating thereof; and
   e) a control, the control predetermining a force required to maintain melt pressure during the pack and hold interval and a supplemental force to be supplied by the hydraulic actuators so that the motors engaged to operate the plunger will be operated within the applicable continuous duty rating thereof.

9. The injection molding machine according to claim 8 wherein the motors engaged to operate the plunger are operated to prevent step changes of force between injection and the pack and hold interval, the control changing the effective force by predetermined increments at a predetermined rate to conform the effective force to the force required of the motor for the pack and hold interval.

10. The injection molding machine according to claim 8 further comprising engaging means for selectably operatively engaging the plunger with each electric motor for operating the plunger, the motors being operatively engaged with the plunger to provide resistance to translation of the plunger during accumulation of plasticized material and selectably operatively engaged with the plunger to advance the plunger to inject plasticized material into the mold cavities, the hydraulic actuators being operated to inject plasticized material into the mold cavities when the motors are not engaged therefore.

11. The injection molding machine according to claim 10 wherein the electric motors for operating the plunger are rotating machines and the apparatus further comprises a drive screw and drive nut for converting rotation effected by each such motor to translation coupled to the plunger and the engaging means is a clutch for selectably engaging rotation of the motor with one of the drive nut and drive screw whereby rotation of the motor effects translation of the plunger.

12. The injection molding machine according to claim 8 wherein the injection unit further comprises a plasticizing unit comprising a barrel and working screw therein and an accumulator comprising an accumulator cylinder and a plunger therein, plasticized material from the plasticizing unit being accumulated in the accumulator for injection into the mold cavities.

13. The injection molding machine according to claim 12 further comprising engaging means for selectably operatively engaging the plunger with each electric motor for operating the plunger, the motors being operatively engaged with the plunger to provide resistance to translation of the plunger during accumulation of plasticized material and selectably operatively engaged with the plunger to advance the plunger to inject plasticized material into the mold cavities, the hydraulic actuators being operated to inject plasticized material into the mold cavities when the motors are not engaged therefore.

14. The injection molding machine according to claim 8 wherein the hydraulic actuators are operated with pressurized hydraulic fluid supplied from a hydraulic accumulator, the hydraulic accumulator being charged with pressurized hydraulic fluid for operating the hydraulic actuators.

15. A method for injection molding wherein raw material is plasticized and plasticized material is accumulated for injection into at least one mold cavity by a plunger, the plunger being translated with accumulation of plasticized material and being advanced to inject the accumulated plasticized material into the mold cavities, the method comprising:

a) engaging at least one electric motor with the plunger, the motor being engaged with the plunger to provide resistance to translation of the plunger during accumulation of plasticized material and to provide force to advance the plunger to inject plasticized material into the mold cavities; and b) selectably actuating the plunger with hydraulic actuators during a pack and hold interval following injection of melt into the mold cavities to maintain a desired melt pressure while the melt solidifies, the hydraulic actuators being operated to supply supplemental force when force supplied by electric motors engaged to operate the plunger is limited to maintain the operation of the motors within the applicable continuous duty rating thereof.

16. The method according to claim 15 wherein the motors engaged to operate the plunger are operated to prevent step changes of force between injection and the pack and hold interval, the effective force being changed by a predetermined increment at a predetermined rate to conform the effective force to the force required of the motors for the pack and hold interval.

17. The method according to claim 16 further comprising selectably operatively engaging the plunger with each electric motor for operating the plunger, the motors being operatively engaged with the plunger to provide resistance to translation of the plunger during accumulation of plasticized material and selectably operatively engaged with the plunger to advance the plunger to inject plasticized material into the mold cavities, the hydraulic actuators being operated to inject plasticized material into the mold cavities when the motors are not engaged therefore.

18. The method according to claim 15 wherein the electric motors for operating the plunger are rotating machines and rotation of the motor shafts is converted by a drive screw and drive nut to translation coupled to the plunger.

19. The injection molding machine according to claim 13 wherein each electric motor for operating the plunger is a rotating machine and the apparatus further comprises a drive screw and drive nut for converting rotation effected by the motor to translation coupled to the plunger and the engaging device is a clutch for selectably engaging rotation of the motor with one of the drive nut and drive screw whereby rotation of the motor effects translation of the plunger.

* * * * *